United States Patent [19]

Kawai et al.

[11] Patent Number: 5,157,490
[45] Date of Patent: Oct. 20, 1992

[54] TELEVISION SIGNAL SCANNING LINE CONVERTING APPARATUS

[75] Inventors: Kiyoyuki Kawai; Seijiro Yasuki, both of Kanagawa, Japan

[73] Assignee: Kabushiki Kaisha Toshiba, Kawasaki, Japan

[21] Appl. No.: 668,896

[22] Filed: Mar. 13, 1991

[30] Foreign Application Priority Data

Mar. 14, 1990 [JP] Japan .................................. 2-64997

[51] Int. Cl.$^5$ .............................................. H04N 7/00
[52] U.S. Cl. ..................................... 358/140; 358/12; 358/141
[58] Field of Search ........................... 358/12, 140, 141

[56] References Cited

U.S. PATENT DOCUMENTS

| | | | |
|---|---|---|---|
| 4,661,850 | 4/1987 | Strolle et al. | 358/12 |
| 4,926,244 | 5/1990 | Isnardi | 358/12 |
| 4,979,020 | 12/1990 | Isnardi | 358/12 |
| 5,012,326 | 4/1991 | Sakamoto et al. | 358/140 |
| 5,025,309 | 6/1991 | Isnardi | 358/12 |

FOREIGN PATENT DOCUMENTS 63-132584 4/1988 Japan .
2-57081 2/1990 Japan .
9000338 1/1990 PCT Int'l Appl. .

OTHER PUBLICATIONS

SMPT Journal May 1984; M. Achiha et al "A Motion-Adaptive High-Definition Converter for NTSC Color TV Signal" pp. 470–476.

Primary Examiner—James J. Groody
Assistant Examiner—Minsun Oh
Attorney, Agent, or Firm—Cushman, Darby & Cushman

[57] ABSTRACT

A television signal scanning line converting apparatus, where an intra-frame average signal and inter-frame average signal are obtained by processing a progressive scanning signal in a unit of two frames with a delaying circuit and adders. A lowpass filter limits the horizontal and vertical bands of an intra-frame difference signal to reduce the field amount. If the input progressive scanning signal is a moving picture, the low vertical range of the intra-frame difference signal will be multiplexed to the high vertical range part of the intra-frame average signal and the high vertical range of the intra-frame difference signal will be transmitted separately so that the resolution of the moving picture will improve and no deterioration, caused by the turning distortion, will be produced.

9 Claims, 4 Drawing Sheets

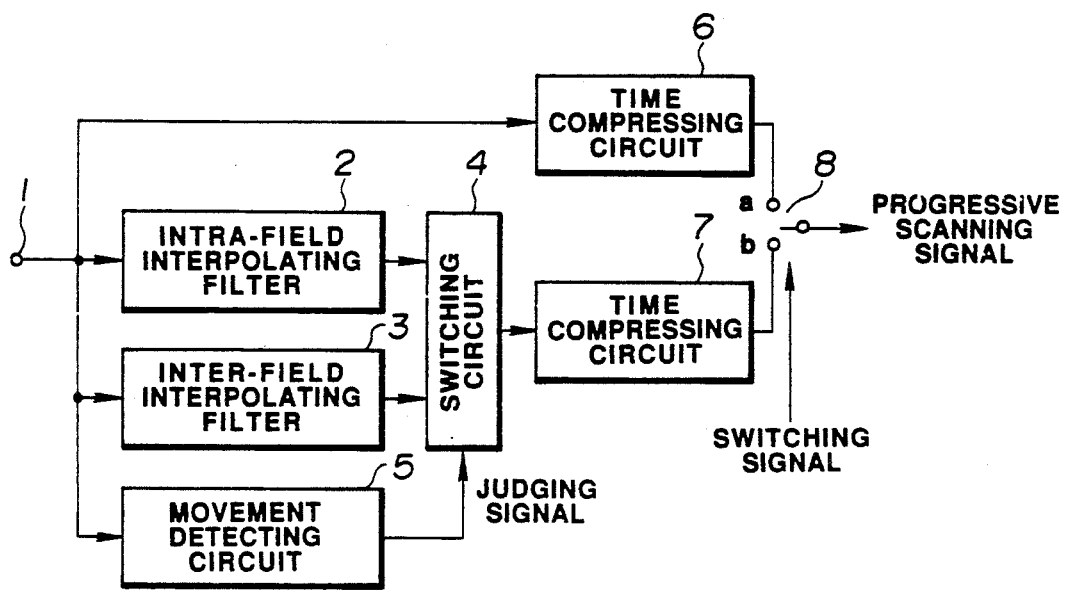
FIG. 5
(PRIOR ART)
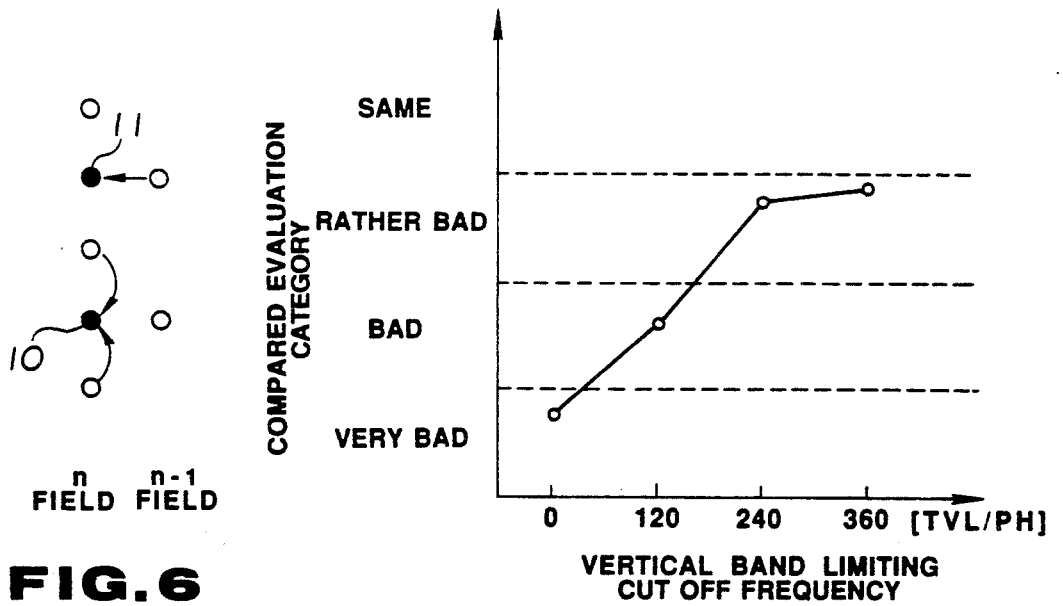
FIG. 6
(PRIOR ART)
FIG. 7

TELEVISION SIGNAL SCANNING LINE CONVERTING APPARATUS

BACKGROUND OF THE INVENTION

1. Field of the Invention

This invention relates to a television signal scanning line converting apparatus wherein, on the transmitting side, a progressive scanning signal is converted to an interlaced scanning signal which is transmitted and, on the receiving side, the interlaced scanning signal is converted to a progressive scanning signal.

2. Background of the Prior Art

In an NTSC system television broadcast, there is adopted an interlaced scanning system in which, by dividing one picture into a first field and second field which are transmitted, the band width is saved and a highly efficient transmission is made. However, as the television receiving apparatus becomes high in the luminance and large in the picture, a line flicker becomes conspicuous. Therefore, in the television receiving apparatus or the like, there may be adopted a scanning line converting apparatus wherein an interlaced scanning signal is converted to a progressive scanning signal by making an interpolation by using an image memory in order to reduce the line flicker and to improve the resolution.

FIG. 5 (PRIOR ART) is a block diagram showing a related art of such a television signal scanning line converting apparatus. FIG. 6 (PRIOR ART) is an explanatory view for explaining the operation of the prior art by taking the time of a field unit in the horizontal direction and taking the vertical direction of the drawing in the vertical direction. In FIG. 6, the white circle represents a scanning line based on a television signal transmitted by an interlaced scanning system and the black circle represents an interpolating scanning line obtained by an interpolation.

An interlaced signal input through an input terminal 1 is given to an intra-field interpolating filter 2 and inter-field interpolating filter 3. As shown by an interpolating scanning line 10 in FIG. 6, the intra-field interpolating filter 2 obtains an interpolating signal from the upper and lower scanning lines within the same field and outputs this interpolating signal to a switching circuit 4 as an interpolating signal for a moving picture. On the other hand, as shown by an interpolating scanning line 11 in FIG. 6, the inter-field interpolating filter 3 obtains an interpolating signal from a scanning line of a front field and outputs this interpolating signal to the switching circuit 4 as an interpolating signal for a still picture. The interlaced signal from the input terminal 1 is given also to a movement detecting circuit 5 which judges whether the transmitted interlaced signal is a moving picture or still picture and gives the judging signal to the switching circuit.

Now, in case the interlaced scanning signal from the input terminal is a still picture, the switching circuit 4 will output the output of the inter-field interpolating filter 3 as an interpolating signal on the basis of the judging signal. In this case, the now transmitted scanning line and the scanning line of the front field will be simultaneously used and all effective scanning lines (480 lines in the NTSC system) will be used for the process. Therefore, in the NTSC system still picture, a vertical resolution of 480 [TVL/PH]([TV lines/picture height]) can be obtained.

On the other hand, in the moving picture, as the picture pattern is different between the front and rear fields, if it is processed between the fields as in the interpolating scanning line 11 in FIG. 6, by the lag between the front and rear fields, the image will be doubled and the displayed picture quality will be broken. Therefore, in the moving picture, as shown by the interpolating scanning line 10 in FIG. 6, an intra-field interpolation is adopted and, by the judging signal from the movement detecting circuit 5, the switching circuit 4 outputs the output of the intra-field interpolating fiter 2 as an interpolating signal. Thereby, the interpolating signal will be produced from only the signal within the same field and the picture quality will not be broken.

The interpolating signal from the switching circuit 4 is reduced in time by ½ by a time compressing circuit 7 and is given to the terminal $b$ of a switch 8. An interlaced scanning signal from the input terminal 1 is reduced in time by ½ by a time compressing circuit 6a and is given to the terminal $a$ of the switch 8. The switch 8 selectively switches the terminals $a$ and $b$ for each scanning line by a horizontal period switching signal. That is to say, the scanning line not transmitted by the interlaced scanning in a predetermined field is interpolated by selecting the output of the time compressing circuit 7 with the switch 8. Thus, a progressive scanning signal is output from the output end of the switch 8.

Now, in the case of the NTSC system, the number of effective scanning lines within one field is 240 lines. Therefore, in the case of the interpolation by the scanning lines within the field, a vertical resolution above 240 [TVL/PH] will not be able to be obtained in principle. That is to say, in the moving picture, only a vertical resolution of 240 [TVL/PH] can be obtained. On the other hand, in the still picture, as described above, a vertical resolution of 480 [TVL/PH] can be obtained by the inter-field interpolation.

However, if the vertical band is limited to 240 [TVL/PH] on the transmitting side, the picture quality will become obscure. Therefore, on the transmitting side, a band wider than 240 [TVL/PH] can not help being transmitted. That is to say, in the moving picture, as a signal in a wide band is input, a turning distortion will be generated, further only a resolution ½ that of the still picture will be obtained and the picture will be obscure. If the interpolating method is switched in conformity with the motion of the picture pattern, at the time of a still picture, a sharp image will be made but, at the time of a moving picture, an obscure image having a turning distortion will be made. There has been a problem that, by the resolution difference between the time of the still picture and the time of the moving picture, the video image will be unnatural in the sight.

SUMMARY OF THE INVENTION

An object of the present invention is to provide a television signal scanning line converting apparatus making it possible to transmit a narrow band without generating a turning distortion.

Another object of the present invention is to provide a television signal scanning line converting apparatus whereby a natural looking video image can be obtained at a high resolution by improving the resolution of a moving picture.

The television signal scanning line converting apparatus of the present invention comprises an adding means for obtaining a resolution component by determining the sum before and after a frame to which an input progressive signal is given on the transmitting side, a subtracting means for obtaining a motion component by determining the difference before and after a frame to which an input progressive scanning signal is given and a band limiting means for limiting the horizontal and vertical bands of the motion component and delivering the motion component together with the resolution component. Also, the television signal scanning line converting apparatus of the present invention comprises a scanning line converting means for converting a progressive scanning signal inputted on the receiving side to a progressive scanning signal of ½ the frame frequency and outputting the progressive scanning signal, a vertical space frequency separating filter separating the above mentioned progressive scanning signal into a high vertical space frequency range component and low vertical space frequency range component, a moving picture mode processing means for shifting the vertical space frequency by turning the polarity on each scanning line for the above mentioned high vertical space frequency range component, temporarily shifting the space frequency by turning the polarity in each field, then adding them to the field repeating component of the above mentioned low vertical space frequency range component and outputting the sum, a still picture mode processing means for outputting a field repeating signal of the progressive signal from the above mentioned scanning line converting means and a switching means for selectively outputting the output of the above mentioned moving picture mode processing means and the output of the above mentioned still picture mode processing means in conformity with the motion.

The other features and advantages of the present invention will become apparent with the following explanation.

BRIEF DESCRIPTION OF THE DRAWINGS

FIG. 5 (PRIOR ART) is a block diagram showing a conventional television signal scanning line converting apparatus.

FIG. 6 (PRIOR ART) is an explanatory view for explaining the operation of the conventional example.

FIG. 7 is a graph for explaining an embodiment of the present invention.

DETAILED DESCRIPTION OF THE PREFERRED EMBODIMENTS

Figure 1:
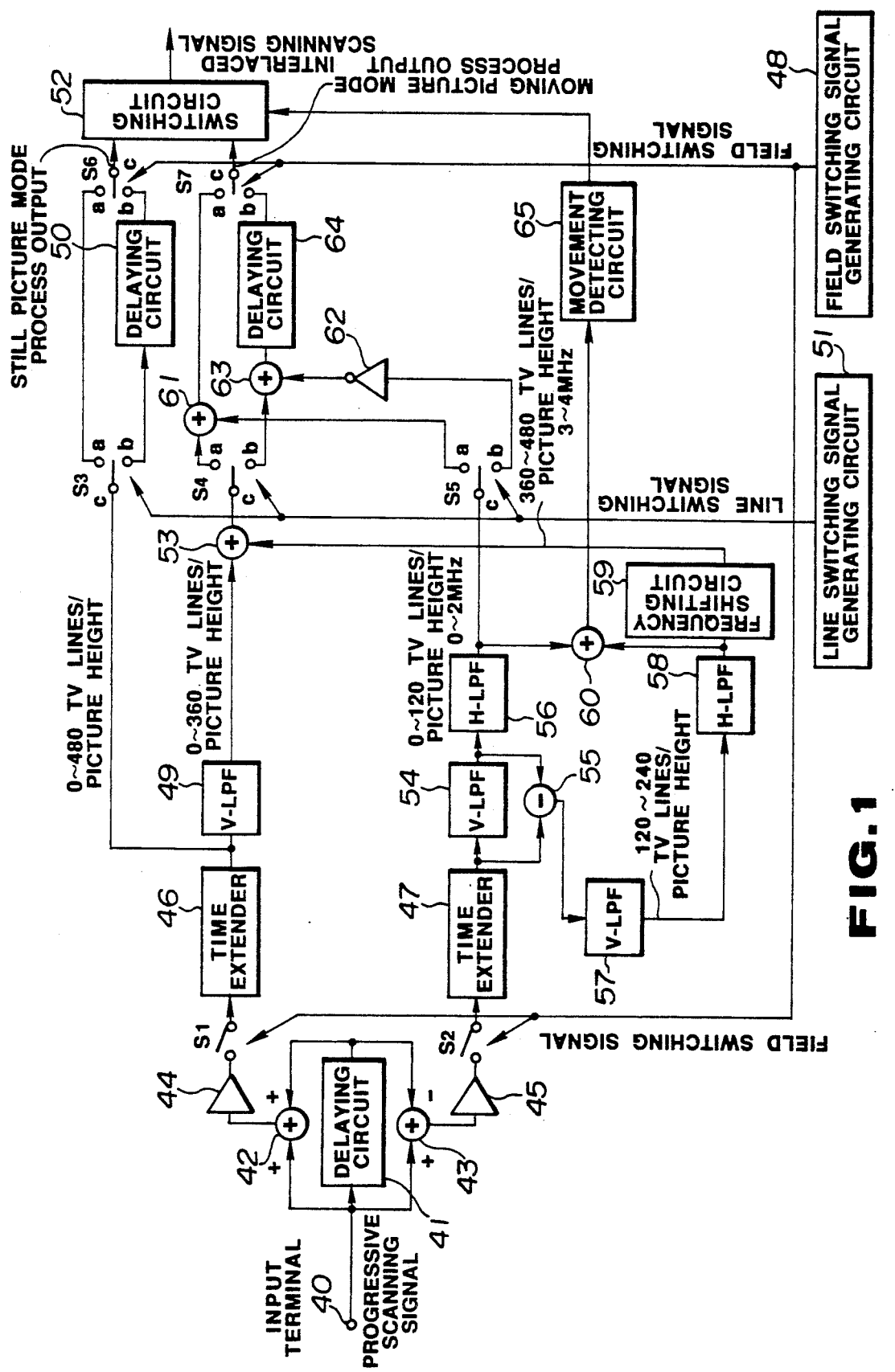
FIG. 1 is a block diagram showing an embodiment of the transmitting side of a television signal scanning line converting apparatus according to the present invention.

FIG. 1 is a block diagram showing an embodiment of the transmitting side of a television signal scanning line converting apparatus according to the present invention.

This embodiment shows an example that a progressive scanning signal of 525 scanning lines is transmitted as converted to an interlaced scanning signal of an NTSC system.

A progressive scanning signal of a frame frequency of 59.94 Hz (also called 60 Hz for the sake of convenience hereinafter) is input into an input terminal 40 and is given to a delaying circuit 41 and adders 42 and 43. The delaying circuit 41 delays the input signal by 1/59.94 second (also called 1/60 second for the sake of convenience hereinafter and outputs it to the adders 42 and 43. Progressive signals of around 1/60, second are input into the adder 42 from the input terminal 40 and delaying circuit 41 and are added and an average signal within the frame is output to a counter 44. On the other hand, the progressive scanning signals of around 1/60 second are inputted also into the adder 43 and are subtracted and a difference signal within the frame is output to a counter 45. In the counters 44 and 45, the respective input signals are made ½ time as large and are output to time extenders 46 and 47 respectively through switches S1 and S2. The switches S1 and S2 to which field period field switching signals are given from a field switching signal generating circuit 48 alternately switching on/off respective fields. Each of the time extenders 46 and 47 extends the time of the input signal to be twice as long and outputs the signal. First and second progressive scanning signals of a frame frequency of 29.97 Hz (also called 30 Hz for the sake of convenience hereinafter) are output respectively out of the time extenders 46 and 47.

The output of the time extender 46 is given to a low pass filter (called a V-LPF hereinafter) passing a low vertical range component and the terminal c of a switch S3. The terminal a of the switch S3 is connected to the terminal a of the switch S6 and the terminal b of the switch S3 is connected to the terminal b of the switch S6. The delaying circuit 50 delays the input signal by 1/60 second and outputs it. The switch S3 is switched in a line period by a line switching signal from a line switching signal generating circuit 51 and the switch S6 is switched in a field period by a field switching signal from a field switching signal generating circuit 48. That is to say, an interlaced scanning signal of a field frequency of 59.94 Hz and frame frequency of 29.97 Hz appears at the terminal c of the switch S6. This interlaced signal is of a vertical space frequency of 0 to 480 [TVL/PH] and is given to a switching circuit 52 as a still picture mode process output.

On the other hand, the V-LPF 49 limits the band of the output of the time extender 46 to be in a low vertical range of 0 to 360 [TVL/PH] and outputs it to an adder 53 as a moving picture resolution signal. The adder 53 adds the output of the V-LPF 49 and the high vertical range component output from a later described frequency shifting circuit 59 and gives the sum to the terminal c of the switch S4.

The high vertical range component and motion component (called a temporal component hereinafter) added to the moving picture resolution signal are obtained on the basis of the output of the time extender 47. That is to say, the output of the time extender 47 which is an intra-frame difference signal is given to the V-LPF 54 and subtracter 55. The V-LPF 54 limits in the band the output of the time extender 47 to be in a low vertical range of 0 to 120 [TVL/PH] and outputs it to a low pass filter (called an H-LPF hereinafter) 56 passing a low horizontal range component and the subtracter 55. The H-LPF 56 limits in the horizontal band the output of the V-LPF 54 to be 0 to 2 MHz and outputs it to the terminal c of the switch S5 and the adder 60. That is to say, the intra-frame difference signal is limited in the band to be 0 to 2 MHz horizontally and 120 [TVL/PH] vertically and is given as a motion component to the terminal c of the switch S5.

On the other hand, the subtracter 55 obtains a signal of 120 to 480 [TVL/PH] by subtracting the input and output of the V-LPF 54 and outputs it to a V-LPF 57. The V-LPF 57 obtains a component of a vertical space frequency of 120 to 240 [TVL/PH] by limiting in the band the output of the subtracter 55 and gives it to an H-LPF 58. The H-LPF 58 limits the horizontal frequency of the input signal to be below 1 MHz and outputs it to a frequency shifting circuit 59 and adder 60. The frequency shifting circuit 59 shifts in the frequency the input signal to a signal of 3 to 4 MHz horizontally and 360 to 480 [TVL/PH] vertically and gives it to an adder 53. The adder 53 is given a signal of 0 to 360 [TVL/PH] from the V-LPF 49, is given a signal of 360 to 480 [TVL/PH] from the frequency shifting circuit 59, multiplexes these signals and gives them to the terminal c of the switch S4.

The terminal a of the switch S4 is connected to the terminal a of the switch S7 through an adder 61 and the terminal b is connected to the terminal b of the switch S7 through a delaying circuit 64. The switch S4 is switched in a line period by a line switching signal from the line switching signal generating circuit 51. The switch S7 is switched in a field period by a field switching signal from the field switching signal generating circuit 48. The adder 61 adds the signal from the terminal a of the switch S4 and the signal from the terminal a of the switch S5 and gives the sum to the terminal a of the switch 7. The adder 63 is given a signal from the terminal b of the switch S5 with the polarity turned by a polarity turning circuit 62, adds this signal and the signal from the terminal b of the switch S4 and outputs the sum to the delaying circuit 64. The delaying circuit 64 delays the output of the adder 63 by 1/60 second and gives it to the terminal b of the switch S7. That is to say, an interlaced scanning signal in which the motion component of the input progressive scanning signal kept as it is appears at the terminal c of the switch S7 and has a high vertical range (120 to 240 [TVL/PH]) of an intra-frame difference signal in the time direction multiplexed. The signal at the terminal c of the switch S7 is given to a switching circuit 52 as a moving picture mode process output.

The switching circuit 52 is controlled by a detecting circuit 65. The adder 60 combines the outputs of the H-LPF's 56 and 58 and gives them to the motion detecting circuit 65 which detects the image motion from the output of the adder 60. The switching circuit 52 selectively switches the still picture mode process output and moving picture mode process output by the output of the motion detecting circuit 65 and outputs them as interlaced scanning signals.

The operation of the thus formed embodiment shall be explained in the following.

In this embodiment, an input interlaced scanning signal is separated into an intra-frame average signal and intra-frame difference signal by the delaying circuit 41 and adders 42 and 43. FIG. 7 shows subject evaluation experiment results on images of much motion where a cut-off frequency is taken on the abscissa, a compared evaluation category is taken on the ordinate and a vertical band limiting cut-off frequency of an intra-frame difference signal is made a parameter. By the way, in this experiment, the intra-frame difference signal is limited in the band to be below 2.7 MHz horizontally. As shown in FIG. 7, even if the intra-frame difference signal is limited to be in a low vertical range below 240 [TVL/PH], the picture quality will not substantially deteriorate. On the basis of these experiment results, in this embodiment, the intra-frame difference signal is limited in the band in the horizontal and vertical directions to reduce the transmitted amount.

The intra-frame average signal output from the adder 42 is a resolution component giving a resolution in the vertical direction. In the case of a still picture, merely a field repetition may be made. By the switches S3 and S6 and the delaying circuit 50, the first and second field signals are obtained from the output of the time extender 46. On the other hand, in the case of a moving picture, the intra-frame average signal limited in the band in the high diagonal range is used as a signal representing the vertical resolution. By utilizing this band, the component of 120 to 240 [TVL/PH] of the motion component is multiplexed as described later.

An intra-frame difference signal as a motion component giving a natural motion is output from the adder 43. This signal is given to the V-LPF 54 and H-LPF 56 and is limited in the band. A motion component of a vertical space frequency of to 0 to 120 [TVL/PH] and a horizontal band of 0 to 2 MHz is given to the terminal c of the switch S5. On the other hand, the subtracter 55 obtains a high vertical range component by subtracting the input and output of the V-LPF 54. This component is limited in the band by the V-LPF 57 and H-LPF 58, is further shifted in the frequency by the frequency shifting circuit 59, is converted to a high vertical range component of a vertical space frequency of 360 to 480 [TVL/PH] and a horizontal band of 3 to 4 MHz and is given to the adder 53. A signal of 0 to 360 [TVL/PH]representing a vertical resolution is also input into the adder 53 from the V-LPF 49. The vertical frequencies of both inputs of the adder 53 are separated and the adder 53 multiplexes both and outputs them to the switch S4.

The motion component from the H-LPF 56 is added to the signal from the switch S4 by the adders 61 and 63 and polarity turning circuit 62. After all, the motion component and the high vertical range component of the intra-frame difference signal are added to the signal representing the vertical resolution at the time of the moving picture. This signal is separated into signals of the first and second fields by the switches S4 and S7 and delaying circuit 64 and is given as a moving picture mode process output to the switching circuit 52.

On the other hand, the movement detecting circuit 65 detects the motion of an image out of the output of the adder 60 and controls the switching circuit 52 in response to the motion of the image. Thereby, the switching circuit 52 switches a still picture mode process output and moving picture mode process output in response to the motion of the image. That is to say, the switching circuit 52 will select and output a still picture mode process output at the time of a still picture and will select and output a moving picture mode process output at the time of a moving picture. Thus, a video signal of a vertical space frequency of 480 [TVL/FH] and field frequency of 60 Hz and interlaced at 2:1 is output from the switching circuit 52.

By the way, in this embodiment, the output of the H-LPF 58 is multiplexed in a diagonally high range of the output of the V-LPF 49 but the method of multiplexing the output signal of the H-LPF 58 is not limited to this. Even if the signal is transmitted by any other multiplexing method, the same effect will be able to be obtained.

Figure 2:
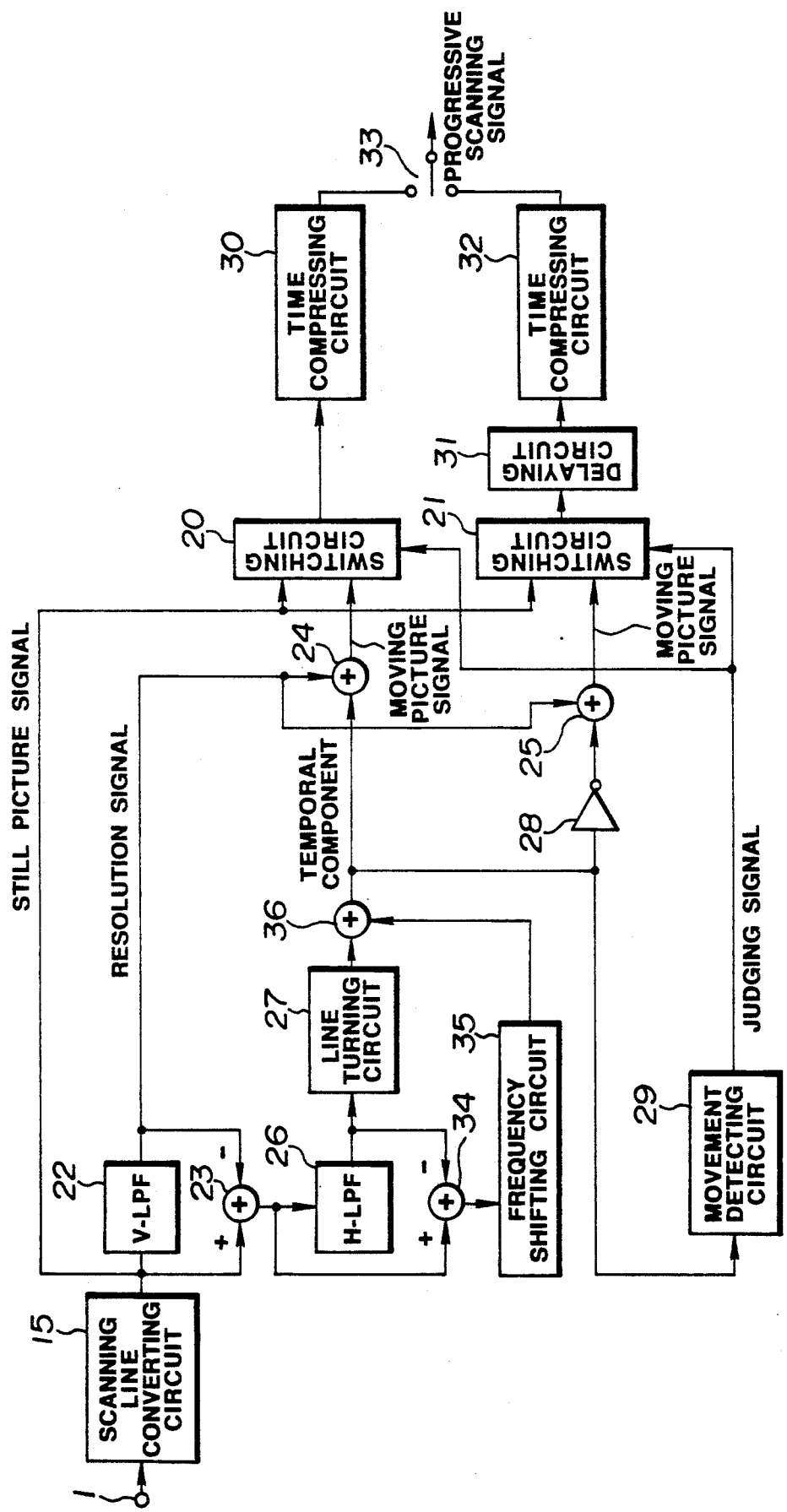
FIG. 2 is a block diagram showing an embodiment of the receiving side of a television signal scanning line converting apparatus according to the present invention.

FIG. 2 is a block diagram showing an embodiment on the receiving side of a television signal scanning line converting apparatus according to the present invention.

This embodiment shows an example that a television signal having a compatibility with an NTSC system is converted to a progressive scanning signal. A video signal of a scanning line number of 525 lines, field frequency of 59.97 Hz and scanning system interlaced at 2:1 is input into an input terminal 1.

Figure 3:
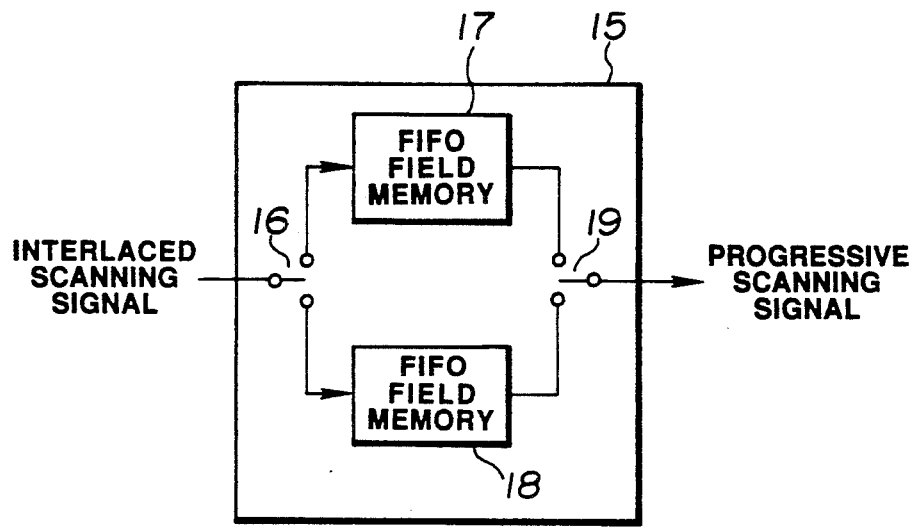
FIG. 3 is a block diagram showing a concrete formation of a scanning line converting circuit 15.

FIG. 3 is a block diagram showing the concrete formation of a scanning line converting circuit 15 in FIG. 2. A video signal is given to FIFO field memories 17 and 18 through a switch 16 from the input terminal 1. The switch 16 is switched for each field. A video signal, for example, of the first field is memorized in the FIFO field memory 17 and a video signal, for example, of the second field is memorized in the FIFO field memory 18. The outputs of the FIFO field memories 17 and 18 are output through a switch 19 which is switched for each line. A video signal of a scanning line number of 525 lines, frame frequency of 29.97 Hz and progressive scanning system is output from the output end of the switch 19.

The video signal from the scanning line converting circuit 15 is output as a still picture signal to the switching circuits 20 and 21 and also to the V-LPF 22. The V-LPF 22 separates a low vertical range component below 360 [TVL/PH] from the input signal and outputs it. This low vertical range component is a signal representing a vertical resolution of 360 [TVL/PH]. The output of the V-LPF 22 is output to adders 23, 24 and 25. The adder 23 gives also a video signal from the scanning line converting circuit 15. BY subtracting the output of the V-LPF 22 from this video signal, a high vertical range component of a vertical space frequency above 360 [TVL/PH] is output. As the input image signal is transmitted by the interlaced scanning system, the output (vertical space frequency of 360 to 480 [TVL/PH]) of the adder 23 represents a turning component, that is, a temporal component representing the motion in the case of a moving picture.

The output of the adder 23 is given to the H-LPF 26 and adder 34. The H-LPF 26 limits the input signal to a band of 0 to 2 MHz and outputs it. This band corresponds to a horizontal space frequency of 160 TV lines and can obtain a natural by appearing motion. Also, the output of the H-LPF 26 is given to a line turning circuit 27 and adder 34.

The adder 34 operates the difference between the input and output of the H-LPF 26 and gives the operation result to a frequency shifting circuit 35. The frequency shifting circuit 35 shifts in the frequency the output of the adder 34 and gives it to the adder 36. The output of the frequency shifting circuit 59 of the transmitting side apparatus in FIG. 1 is extracted by the difference operation of the adder 34 and is converted to the original spectrum by the frequency shifting circuit 35.

The line turning circuit 27 turns the input temporal component on each line. Thereby, the temporal component is shifted in the frequency by 480 [TVL/PH] in the vertical direction. That is to say, by the line turning circuit 27, the temporal component will be shifted to a low range of a vertical space frequency of 0 to 120 [TVL/PH]. The output of the line turning circuit 27 is given to the adder 36. The adder 36 adds the output of the line turning circuit 27 and the output of the frequency shifting circuit 35 and outputs the sum. This output is given to the adder 24 and is given also to the adder 25 through the polarity turning circuit 28. The adder 24 adds the temporal component shifted in the low range from the line turning circuit 27 to the signal representing the vertical resolution from the V-LPF 22 and outputs the sum as a moving picture signal to the switching circuit 20. The adder 25 adds the turning signal of the temporal component shifted in the low range to the signal representing the vertical resolution and outputs the sum as a moving picture signal to the switching circuit 21. That is to say, by the polarity turning circuit 28, the temporal component will be shifted in the high temporal space frequency and will be given to the adder 25 and the moving picture signals from the adders 24 and 25 will correspond to the motions of the picture patterns, respectively, of the first field and second field.

On the other hand, the output of the adder 36 is given also to a motion detecting circuit 29. The motion detecting circuit 29 judges whether a moving picture or a still picture by the output of the adder 36 and outputs a judging signal to switching circuits 20 and 21. When a judging signal showing a still picture is input, either of the switching circuits 20 and 21 will output a still picture signal from the scanning line converting circuit 15. Also, when a judging signal showing a moving picture is input, the switching circuit 20 will output a moving picture signal from the adder 24 to a time compressing circuit 30 and the switching circuit 21 will output a moving picture signal from the adder 25 to a delaying circuit 31 by a judging signal showing a moving picture.

The delaying circuit 31 delays the output of the switching circuit 21 by 1/60 second and outputs it to a time compressing circuit 32. Either of the time compressing circuits 30 and 32 compresses the time of the input signal to ½ and outputs the signal to a switch 33. The switch 33 is switched in a field period to output alternately the outputs of the time compressing circuits 30 and 32.

Figure 4:
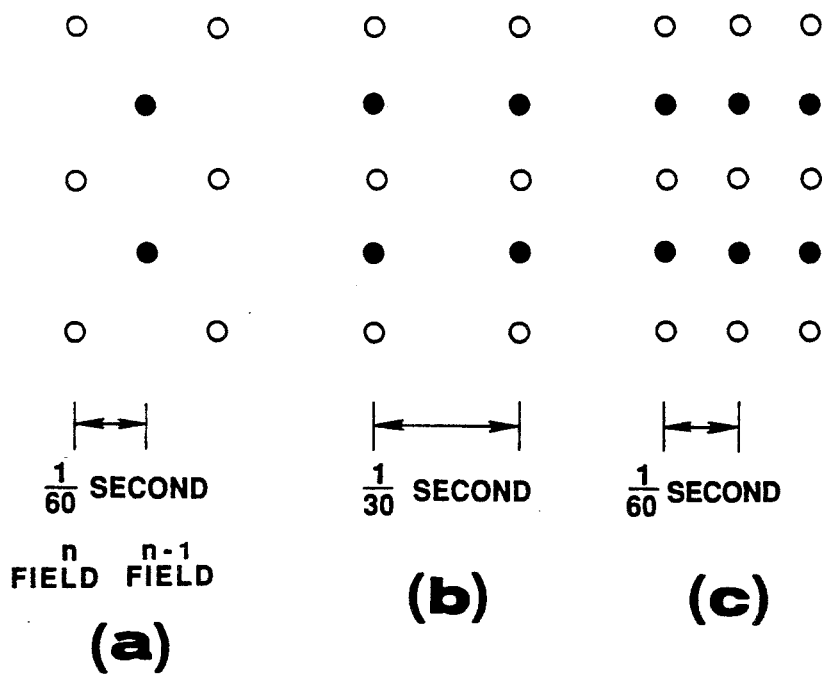
FIG. 4 is an explanatory view for explaining the operation of the embodiment.

The operation of the thus formed television signal scanning line converting apparatus on the receiving side shall be explained below, with reference to FIG. 4, which is an explanatory view for explaining the operation of an embodiment by taking the time of a field unit in the horizontal direction and taking the vertical direction of the drawing in the vertical direction.

A video signal having a compatibility with an NTSC system and input through the input terminal 1 is given to the scanning line converting circuit 15. As shown in FIG. 4(a), a video signal of a field frequency of 60 Hz and scanning system interlaced 2:1 is input into the scanning line converting circuit 15. In the scanning line converting circuit 15, the first and second fields of this signal are memorized respectively in the FIFO memories 17 and 18 and are alternately read out in a line period by the switch 19 and thereby, as shown in FIG. 4(b), the input signal is converted to a video signal of a progressive scanning system of a frame frequency of 30 Hz and is output. The number of effective scanning lines of the video signal of the NTSC system is 480 lines and the output of the scanning line converting circuit 15 has a spectrum of a vertical space frequency of 0 to 480 [TVL/PH].

The output of the scanning line converting circuit 15 has a low vertical range component below 360

[TVL/PH] separated by the V-LPF 22. The output of the V-LPF 22 is a resolution signal representing a vertical resolution of 360 [TVL/PH]. The adder 23 operates the difference between the input and output of the V-LPF 22 to obtain a high vertical range component above 360 [TVL/PH], that is, a temporal component representing the motion of a moving picture.

The temporal component from the adder 23 is limited in the band to a low range by the H-LPF 26 and is then given to the line turning circuit 27. In the line turning circuit 27, the input temporal component is turned in the polarity on each line, are thereby shifted in the frequency by 480 TV lines in the vertical direction and is converted to be in a low range of 0 to 120 [TVL/PH]. The temporal component converted to be in the low range is added to the resolution signal from the V-LPF 22 by the adder 24, is given to the switching circuit 20, is turned in the polarity by the polarity turning circuit 28, is then added to the resolution signal from the V-LPF 22 in the adder 25 and is given to the switching circuit 21.

On the other hand, the motion detecting circuit 29 judges whether a still picture or a moving picture is generated from the output of the adder 36, and outputs a judging signal to the switching circuits 20 and 21 which will output a still picture signal from the scanning line converting circuit 15 when it is shown by the judging signal to be a still picture and will output moving picture signals respectively from the adders 24 and 25 when it is shown by the judging signal to be a moving picture. The output of the switching circuit 20 is compressed in the time to ½ by the time compressing circuit 30 and is output through the switch 33. Also, the output of the switching circuit 21 is delayed by 1/60 second by the delaying circuit 31, is then compressed in the time to ½ by the time compressing circuit 32 and is output through the switch 33 which alternately outputs the outputs of the time compressing circuits 30 and 32 in a field period. Thereby, as shown in FIG. 4(c), a progressive scanning system video signal (of a scanning line number of 525 lines) of a frame frequency of 60 Hz will be output from the switch 33.

When the temporal component from the adder 36 is turned in the polarity by the polarity turning circuit 28 and is delayed by 1/60 second by the delaying circuit 31 and the switch 33 switches the outputs of the time compressing circuits 30 and 32 in a field period and outputs them, the temporal component will be equivalently converted to a field turning signal and a temporal component of a space frequency of 30 Hz will be reproduced. When this temporal component is added to the resolution signal by the adder 25, the motion at the time of a moving picture will not become unnatural.

By the way, at the time of a still picture, the still picture signal from the scanning line converting circuit 15 will be output from the switching circuits 20 and 21 and horizontal and vertical filter processes will not be made. That is to say, the output from the switch 3 will be a field repetition of the progressive scanning signal shown in FIG. 4(b) and therefore will have a resolution of a vertical space frequency of 480 [TVL/PH].

Thus, in this embodiment, at the time of a moving picture, a moving picture signal having a sufficient resolution of 360 [TVL/PH] limited in the band by the V-LPF 22 will be output from the switching circuits 20 and 21. When the temporal component, having a high vertical range spectrum from the adder 23, is shifted in the frequency to a low vertical range by the line turning circuit 27 and is turned in each field, the component of a temporal space frequency of 30 Hz will be reproduced and the natural motion of the moving picture will be reproduced. Thus, at the time of a still picture, a vertical resolution of 480 [TVL/PH] will be obtained and, at the time of a moving picture, a vertical resolution of 360 TVL/PH] will be able to be obtained, The resolution difference between the time of the still picture and the time of the moving picture will be reduced and, even by switching the still picture and moving picture, a video image natural in the sight will be able to be obtained.

The difference between the input and output signals of the H-LPF 26 is operated with the adder 34 to extract the high vertical range component of the frequency shifting circuit 59 of the transmitting side apparatus shown in FIG. 1. This high vertical range component is converted to the original spectrum by the frequency shifting circuit 35 and is added to the output of the line turning circuit 27 by the adder 36. As the high vertical range component is added, a progressive scanning signal more faithful to the motion will be able to be obtained.

In the above, the explanation has been made in consideration of the compatibility with the NTSC system. However, it is needless to say that the present invention can be worked also in a PAL system and any other television systems.

It is apparent that, in the present invention, working modes different in a wide range can be formed on the basis of the present invention without deviating from the spirit and scope of the invention. The present invention is not restricted by its specific working modes.

What is claimed is:

1. A television signal scanning line converting apparatus comprising:
   an adding means for obtaining a resolution component by determining a sum of a first frame and a second frame of an input progressive scanning signal, the first frame being an undelayed frame of the input progressive scanning signal, the second frame being a delayed frame of the input progressive scanning signal;
   a subtracting means for obtaining a motion component by determining a difference between the first frame and the second frame of the input progressive scanning signal; and
   a band limiting means for limiting a horizontal band and a vertical band of the motion component and generating an interlaced scanning signal, said interlaced scanning signal including the motion component limited by the band limiting means and the resolution component.

2. A television signal scanning line converting apparatus comprising:
   a delivering means comprising an adding means for obtaining a resolution component by determining a sum of a first frame and a second frame of an input progressive scanning signal, the first frame being an undelayed frame of the input progressive scanning signal, the second frame being a delayed frame of the input progressive scanning signal; a subtracting means for obtaining a motion component by determining a difference between the first and second frame of the input progressive scanning signal; and a band limiting means for limiting a horizontal band and a vertical band of the motion component and generating an interlaced scanning signal, said interlaced scanning signal including the motion component limited by the band limiting means and the resolution component; and a receiving means for converting the interlaced scanning signal generated from the delivering means to an output progressive scanning signal.

3. A television signal scanning line converting apparatus comprising:

an adding means for obtaining a resolution component by determining a sum of a first and a second frame of an input progressive scanning signal, the first frame being an undelayed frame of the input progressive scanning signal, the second frame being a delayed frame of the input progressive scanning signal;

a subtracting means for obtaining a motion component by determining a difference between the first and second frame of the input progressive scanning signal; and a band limiting means for limiting a horizontal band and a vertical band of the motion component, and limiting a diagonal band of the resolution component.

4. A television signal scanning line converting apparatus comprising:

an adding means for obtaining a resolution component by determining a sum of a first and a second frame of an input progressive scanning signal, the first frame being an undelayed frame of the input progressive scanning signal, the second frame being a delayed frame of the input progressive scanning signal;

a subtracting means for obtaining a motion component by determining a difference between the first and second frame of the input progressive scanning signal;

a first band limiting means for limiting a horizontal band and a vertical band of the motion component;

a second band limiting means for limiting a diagonal band of the resolution component;

a still picture mode converting means for converting the motion component limited by the first band limiting means and the resolution component obtained by the adding means to an interlaced scanning signal when the input progressive scanning signal is a still picture; and a moving picture mode converting means for converting the motion component limited by the first band limiting means and the resolution component limited by the second band limiting means to an interlaced scanning signal when the input progressive scanning signal is a moving picture.

5. A television signal scanning line converting apparatus according to claim 4, wherein the moving picture mode converting means multiplexes the motion component limited by the first band limiting means and the resolution component limited by the second band limiting means to generate the interlaced scanning signal.

6. A television signal scanning line converting apparatus according to any one of claims 4 or 5, in which the first band limiting means reduces a frequency of the horizontal and vertical bands by approximately ½ when the still picture mode converting means and the moving picture mode converting means generate television signals for an NTSC system.

7. A television signal scanning line converting apparatus comprising:

a scanning line converting means for generating a first progressive scanning signal which has a frame frequency equal to ½ that of an inputted progressive scanning signal when a sum of a first and a second frame of the inputted progressive scanning signal is determined, the first frame being an undelayed frame of the inputted progressive scanning signal, the second frame being a delayed frame of the inputted progressive scanning signal, and for generating a second progressive scanning signal which has a frame frequency equal to ½ that of the inputted progressive scanning signal when a difference between the first and second frame of the inputted progressive scanning signal is determined;

a still picture mode processing means for generating the first progressive scanning signal and generating a delayed first progressive scanning signal, the delayed first progressive scanning signal being obtained by delaying the first progressive scanning signal for one frame period;

a first interlacing converting means for generating a moving picture resolution signal, the moving picture resolution signal being obtained by removing a high vertical space frequency range component of the first progressive scanning signal, and generating a delayed moving picture resolution signal, the delayed moving picture resolution signal being obtained by delaying the moving picture resolution signal for one frame period;

a second interlacing converting means for generating a motion component, the motion component signal being obtained by removing a high vertical space frequency range component of the second progressive scanning signal, and generating a delayed motion component signal, the delayed motion component signal being obtained by delaying the motion component for one frame period and reversing a polarity of the motion component;

a moving picture mode processing means for adding the signals obtained by the first interlacing converting means and the second interlacing converting means; and a switching means for generating the signals obtained by the still picture mode processing means or the signals obtained by the moving picture mode processing means according to the actual motion of an image.

8. A television signal scanning line converting apparatus comprising:

a scanning line converting means for converting an input progressive scanning signal to a progressive scanning signal which has a frame frequency equal to ½ that of the input progressive scanning signal;

a vertical space frequency separating filter separating the progressive scanning signal into a high vertical space frequency range component and low vertical space frequency range component;

a moving picture mode processing means for shifting a vertical space frequency by reversing a polarity on each scanning line of the high vertical space frequency range component, shifting a temporal space frequency by reversing a polarity in each field of the temporal space frequency, then adding the shifted vertical space frequency and the shifted temporal space frequency to a field repeating component of the low vertical space frequency range component;

a still picture mode processing means for generating a field repeating signal of the progressive scanning signal; and a switching means for selecting between the signal generated from the moving picture mode processing means and the signal generated from the still picture mode processing means according to the actual motion of an image.

9. A television signal scanning line converting apparatus comprising:

a scanning line converting means for storing a first field signal and a second field signal of an input interlaced scanning signal, alternately reading out the stored first and second field signals on each scanning line and thereby generating a progressive scanning signal of the same frame frequency as the input interlaced scanning signal;

a vertical space frequency separating filter separating the progressive scanning signal into a low vertical space frequency range component and high vertical space frequency range component;

a vertical space frequency shifting means for reversing a polarity of the high vertical space frequency range component on each scanning line;

a first adder adding the signal generated from the vertical space frequency shifting means and the low vertical space frequency range component;

a polarity reversing circuit reversing a polarity of the signal generated from the vertical space frequency shifting means;

a second adder adding the signal generated from the polarity reversing circuit and the low vertical space frequency range component;

a motion detecting circuit detecting whether the interlaced scanning signal is a still picture or a moving picture;

a first switching means for selecting the progressive scanning signal from the scanning line converting means when a still picture is detected by the motion detecting circuit;

a second switching means for selecting the signals generated from the first and second adders when a moving picture is detected from the motion detecting circuit;

a first time compressing circuit compressing the time of the signal generated from the first switching means;

a delaying circuit delaying the signal generated from the second switching means;

a second time compressing circuit compressing the time of the signal generated from the delaying circuit; and a switch alternately selecting between the first and second time compressing circuits.

* * * * *